Patented May 11, 1943

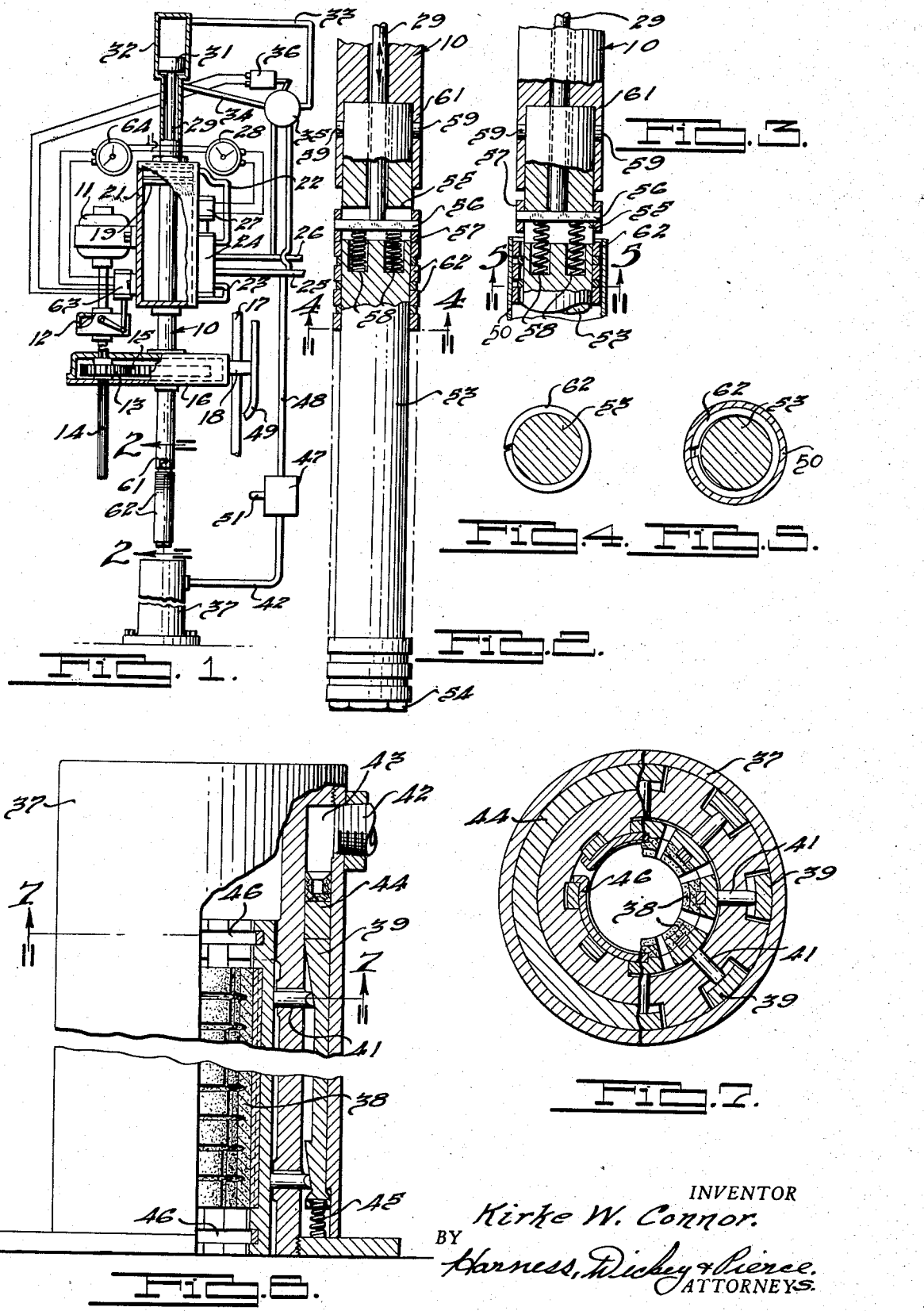

2,318,837

UNITED STATES PATENT OFFICE 2,318,837

PISTON RING HONING METHOD

Kirke W. Connor, Detroit, Mich., assignor to Micromatic Hone Corporation, Detroit, Mich., a corporation of Michigan Application January 31, 1940, Serial No. 316,641

4 Claims. (Cl. 51—290)

This invention relates to honing methods and particularly to a method of honing annular elements, more specifically, elements of the split wall type, such as piston rings.

Progress in the honing art has been made in the past through the development of tools which expand and contract the abrading elements, support the elements in different manners, and control the degree of expansion and the pressures employed in the various stages of honing operation. Recent developments have included a draw honing operation in which cylinders are honed with a reciprocating movement only, to provide scratch marks on the finished surface which are parallel to the cylinder axis.

It was found that the material wear resulting from the friction and heat, in a reciprocating engine, pump, or similar device, was caused by the "wearing in" between the pistons, rings and cylinder wall produced by scratch marks on the mating surfaces which were disposed normal to the direction of movement. Honing tools having overlapping stones were devised for producing the draw honing operation, as disclosed in the copending application of J. E. Kline, Serial No. 257,777 filed February 23, 1939, and assigned to the assignee of the present invention. After proving the principle of draw honing on cylinder walls, applicant is now extending the method to the draw honing of pistons, rings, and other reciprocating parts, to have the finish scratch marks on the surface thereof disposed parallel to the scratch marks in the cylinder wall. All of the finish scratch marks will then be parallel to the axis of reciprocation of the piston, rings and cylinder.

The present method embodies the machining of the split piston rings after the metal cutting operation by rotating and reciprocating a plurality of rings when mounted on an arbor. The rings are first assembled on the arbor and are collapsed to have the ends substantially abutting. This is preferably accomplished by a fluid operated collapsible chuck, after which the arbor is manipulated to secure the rings and retain them in collapsed position. The machine may then be indexed to align the arbor with an external honing tool in which the stones are retracted and in which the rings and arbor are advanced. The stones are then moved inwardly to engage the surface of the rings and the rings are machined as they are rotated and reciprocated by movement of the arbor. The stones are then retracted and the arbor and rings are withdrawn from the tool.

Two different types of machining may then be employed thereafter when draw honing the rings. The first one embodies the insertion of the arbor in a ring bushing and manipulating the arbor to release the rings to permit them to expand against the wall of the bushing. The diameter of the bushing is preferably a few ten-thousandths greater in diameter than the diameter which the rings are to assume in a cylinder. The rings are again clamped when in this expanded position and are re-inserted in the honing tool. The draw honing operation is performed by moving the arbor and rings in reciprocation only, to provide scratch marks on the peripheral surface parallel to the axis of the rings. This operation machines those parts of the rings which project a greater amount due to the ring being out of round and may be repeated several times to make certain that the rings are exactly round when expanded to a desirable diameter within a cylinder wall.

The other type of machining referred to is that of retaining the rings within the tool and releasing the rings to permit them to expand against the stone surfaces. The rings are free to adjust themselves within the stones in accordance with the various pressures exerted at different radial points on each ring. During the draw honing operation machining occurs at the points of greater pressure so that in the final machining operation, like pressures will occur throughout the entire circumference of the ring when of a particular diameter and the scratch marks on the rings will be parallel to their axis. It will thus be seen that the draw honing not only produces the scratch marks parallel to the axis of the cylinder, but by the releasing of the rings, the rings may adjust themselves to the diameter of the external honing tool so as to have some portions machined away more rapidly, depending on the distribution of stresses in the rings, so that when in use on a particular diameter the pressures would be constant throughout the entire circumference of the ring, the periphery of which is a true circle.

Accordingly, the main objects of my invention are; to provide a method of machining whereby the outer surface of piston rings and like reciprocating parts will have the scratch marks thereon disposed parallel to the axis thereof; to provide a method of machining a plurality of split annular elements by first machining the elements in an abrading tool which are relatively rotated and reciprocated and then machining by relative reciprocating movement only when the annular elements are free to expand; to machine annular elements which are free to expand and center themselves relative to an external abrading tool; to provide a method for machining the external surface of split rings which are free to expand under their own tension to bear against the abrasive stones of a tool to be machined to provide a circular periphery when disposed on a predetermined diameter; and in general to provide a method for machining split annular elements which is new and novel when providing a circular periphery under constant pressure for a predetermined diameter.

Other objects and features of novelty of my invention will be specifically pointed out hereinafter or will become apparent, when referring, for a better understanding of my invention, to the following description taken in conjunction with the accompanying drawing, wherein:

Figure 1 is a broken, diagrammatical view in elevation of a device for performing the method embodying my invention;

Fig. 2 is an enlarged view, partly in section, of a spindle supporting an arbor on which the work pieces are mounted, showing the workpieces in clamped position;

Fig. 3 is a view of structure, similar to that illustrated in Fig. 2, with the workpiece in released position;

Fig. 4 is a view of the structure illustrated in Fig. 2, taken on the line 4—4 thereof;

Fig. 5 is a sectional view of structure illustrated in Fig. 3, taken on the line 5—5 thereof;

Fig. 6 is an enlarged view, partly in section, of the honing tool illustrated in Fig. 1; and, Fig. 7 is a sectional view of the structure illustrated in Fig. 6, taken on the line 7—7 thereof.

In Fig. 1 I have illustrated a machine comprising a spindle 10 driven in rotation by a motor 11 which drives through a clutch 12, a gear 13, which is splined to the clutch shaft 14. The gear 13 drives the gear 15 which is fixed to the spindle 10. A housing 16 encloses the gears 13 and 15 and is fixed to and reciprocates with the spindle 10. Guide rod 17 is encompassed by a bracket 18 on the housing 16 for guiding the reciprocating movement of the housing. The spindle 10 is provided with a piston 19 which is disposed within a cylinder 21. Fluid is admitted to either end of the cylinder through conductors 22 and 23, controlled by a four-way valve 24 connected to an intake conduit 25 and to an exhaust conduit 26. A solenoid 27 operates the valve through suitable means herein illustrated as by a timing device 28.

A rod 29 extends through the spindle 10 having on the upper end thereof a piston 31 encased in a cylinder 32 which is supported on the piston to reciprocate therewith. Flexible conduits 33 and 34 deliver and exhaust fluid to either end of the cylinder, controlled by a valve 35 actuated by a solenoid 36.

A honing tool 37 is provided with a plurality of overlapping abrading stones 38 similar to those illustrated and described in the above-mentioned copending application of J. E. Kline. The stones in the present device have concave faces to form a tool for machining external surfaces while that of the above-mentioned application have convex faces forming a circular abrasive head for machining the inner surface of cylinders. A plurality of cams 39 having sloping faces operate pins 41 which move the abrading elements inwardly. This movement is effected by a fluid delivered by a conduit 42 into an annular cylinder 43 which operates an annular piston 44 downwardly to move the cams downwardly therewith against the bias of springs 45.

When the pressure is released from the piston 44 the springs 45 move the cams 39 upwardly to relieve the pressure on the pins 41 which permits the springs 46 to bias the stones outwardly out of contact with the workpiece. The conduit 42 is connected through a valve 47 and conduit 48 to the supply conduit 25. A cam bar 49 is mounted on the bracket 18 in position to engage and operate a plunger 51 of the valve 47 to move the valve to open position to permit a flow of fluid through the conduit 42 into the cylinder 43. The downward movement of the plunger occurs after the workpiece has been inserted in the tool and is retained in position during the abrading operation until the workpiece has been moved upwardly beyond the working reciprocating range, at which time the plunger is released and the abrading elements are retracted by the bias of the springs 46.

While I have illustrated a machine having a single spindle and a single tool, it is to be understood that the table for mounting the tool may slide or rotate so that the chuck for collapsing the split annular workpieces and the ring bushing for limiting the expansion thereof, may be moved into aligned relation with the spindle at various phases of the operation. It is within the purview of the invention to have the spindle movable from one stage to another and a multiple spindle machine having a plurality of stages could likewise be employed to practice my method.

While it has been mentioned heretofore that rings, pistons, and any reciprocating part of a device or any circular element requiring the outer face to be machined could be machined by my method, I have shown for the purpose of illustration a method of machining a plurality of piston rings employed for reciprocating types of engines, pumps, and the like. The finishing scratch marks on the outer surface of the rings are parallel to the axes of the rings and machining occurs relative to the inherent spring set within the rings to compensate for variation in such stress so as to have the ring assume a true circular form when permitted to expand to a predetermined diameter.

The plurality of rings are mounted on an arbor 53 and a nut, cap, or the like 54 is screwed in position to retain the rings thereon. A slot 55 is provided in the arbor in which a bar 56 is disposed having its ends project into a ring 57 which engages the topmost ring of the stack. A plurality of springs 58 urge the bar 56 upwardly within the slot. Pins 59 extend from the top of the arbor and form a bayonet type of joint with the end 61 of the spindle 10.

The rod 29 which projects through the spindle 10 engages the bar 56. When the piston 31 is moved downwardly in the cylinder 32, the bar is moved downwardly against the bias of the springs 58 to move the collar 57 downwardly to thereby clamp the rings 62 together into fixed relation to each other and to the arbor. This downward position of the bar 56 and collar 57 is illustrated in Fig. 2. In Fig. 3, I have illustrated the position of the collar 57 and bar 56 when the rod 29 is retracted through the upward movement of the piston 31 within the cylinder 32.

The clutch 12 is controlled by a solenoid 63 operated by a suitable device, herein illustrated as a timing switch 64. The circuit from the timing device 64 is also connected to the solenoid 36 for operating the valve 35. After the rings have been mounted on the arbor 53, the arbor and rings are disposed in a collapsible chuck (not shown) where they are squeezed to have their ends substantially abutting. Thereafter, the piston 31 is actuated to move the rod 29 downwardly to move the rings together and to lock them in squeezed position on the arbor. The spindle or the tool is then indexed to have the arbor and rings aligned with the tool 37 into which they are inserted.

The motor 11 drives the spindle 10 in rotation and the piston 19 is operated within the cylinder 21 to stroke the arbor and rings in reciprocation. During the first downward stroke, the cam bar 49 engages the plunger 51 and operates the valve 47 to open the circuit to the tool and cause the stones to move inwardly to engage the rings. The arbor and rings are rotated while reciprocated within the working stroke, during which time the plunger 51 retains the valve 47 in open position. This operation continues a predetermined length of time regulated by the time switch 64. After a predetermined time, the circuit is opened to the solenoids 63 and 36 to release the clutch 12 and to raise the piston 31 in the cylinder 32. This interrupts the rotation of the spindle and releases the rings.

Reciprocation only occurs thereafter during the time the rings have expanded against the abrading surface of the stones to have the portions engaging with the greater pressure more rapidly machined. The draw honing operation produces scratch marks about the entire surface of the ring parallel to its axis and the ring is perfectly round when expanded by its own pressure to a predetermined diameter. The split rings 46, for biasing the abrading elements outwardly away from the work piece may be of such diameter and provided with a proper width of gap, which, when closed, provides a predetermined diameter to the stones, which is the desired finish diameter of the rings.

As pointed out hereinbefore, after the honing of the rings in clamped position, another type of machining may be provided by indexing the spindle or tool to have the spindle aligned with a ring bushing 50. The arbor and rings are inserted in the bushing 50 and the rings are released to permit them to expand against the wall of the bushing which is greater than that of the diameter of the cylinder in which the ring is to be employed. Thereafter the rings are again clamped on the arbor. The arbor is then removed from the ring bushing and the spindle and bushing indexed to have the arbor again aligned with the tool. The draw honing operation is then performed with the rings locked in position. After a predetermined number of reciprocations of the spindle, if the rings are not then entirely machined about their circumference, they may again be disposed in the ring bushing, released, expanded, and again locked in position on the arbor and further honed. This operation may be repeated until all portions of the faces of the rings are entirely machined with the scratch marks appearing parallel to the axis of the rings.

When the type of machining is performed in which the rings are clamped to the arbor, the abrasive tool may be shorter than the length of the rings and the working stroke sufficiently long to pass all of the rings into contact with the abrasive tool. When the rings are unclamped, in the other type of machining referred to, it is necessary to provide a honing tool of a length sufficient to encompass the rings at all times during their reciprocation. Collapsible sleeves could be employed at the ends of the tools, but it was found just as economical and more practical to extend the length of the tool to cover the entire working range of the workpieces.

It will thus be seen that when employing my method, the outer circumferences of the workpieces are rapidly machined to substantial diameter through the relative rotation and reciprocation of the workpiece and the abrasive tool. Thereafter, by a draw honing operation in which the abrading stones of the tool are in overlapping relation, finish scratch marks are produced on the peripheral surface parallel to the workpiece axis. When split annular elements are machined, such as piston rings which are provided with an inherent spring set which causes the ends to move apart, the abrading elements are set to a predetermined diameter and the elements are free to adjust themselves relative to the abrasive tool and are machined at the portions engaging with a greater pressure more rapidly, so that for a particular diameter, the tension within the ring will balance and cause the spring to assume a true circular shape after the honing operation. While the split rings may be unclamped to permit them to expand in this manner within the tool, they may also be released within a bushing to expand only a slight amount beyond the diameter on which they are to be employed, clamped in this position and machined while so clamped. This clamping method of machining may be repeated several times until the entire periphery of all of the rings is provided with scratch marks disposed parallel to the ring axes, at which time it will be known that the rings will assume a true circular diameter when freed and permitted to expand to the wall of a cylinder. By my method, not only are the machine marks disposed parallel to the axis of rings, or like elements, to prevent undue friction and wear between reciprocating parts, but the particular machining provides assurance that the variable inherent set of the rings will produce a true cylindrical shape under balanced pressure on the predetermined diameter on which it is employed.

While it has been pointed out hereinabove that the table of the machine may be indexed, that the spindle itself may be indexed, or that a multiple spindle machine may be employed, applicant found it advantageous to employ an additional spindle for the purpose of dressing the tool. It will be apparent that difficulty was presented when attempting to dress the tool, especially one that is mounted in fixed position as the particular external honing tool herein illustrated. Applicant found that by employing an internal abrading tool equipped with stones made from a hard abrasive with a vitreous or similar hard bond, that such tool is ideal for dressing the stones to true circular form and to a desired diameter. Such a tool is illustrated in the above-mentioned copending application of Kline, and is preferably attached to a spindle and rotated and reciprocated within the external tool. The abrasive elements on the internal tool of the J. E. Kline application above-mentioned may be readily dressed to a predetermined diameter. After the tool is inserted in the external tool, the abrading elements thereof are moved outwardly into contact with those of the internal tool which is rotated and reciprocated. The movement of the external abrading stones continues until they reach their set diameter when they are dressed to a true cylindrical form on a desired diameter.

While I have described and illustrated but a single embodiment of my invention, it will be apparent to those skilled in the art that various changes, omissions, additions, and substitutions may be made therein without departing from the spirit and scope of my invention, as set forth in the accompanying claims.

What I claim is:

1. The method of machining the outer surface of a split cylindrical ring which includes the steps of; clamping the ring when collapsed, inserting the ring within a tool having abrading elements which are radially moved into engagement with the outer surface thereof, rotating and reciprocating the ring relative to the abrasive elements to produce a honing operation, releasing the ring, and thereafter discontinuing the rotary movement and finishing the entire peripheral surface of the ring by the relative reciprocating movement between the abrading elements and the split ring while the ring is free to expand.

2. The method of machining the outer surface of a plurality of split rings which includes the steps of; clamping the rings when collapsed, inserting the rings within a tool having abrading elements which are radially moved into engagement with the outer surface thereof, rotating and reciprocating the rings relative to the abrasive elements to produce a honing operation, and thereafter discontinuing the rotary movement and finishing the entire surface of the rings by a relative movement in reciprocation only between the abrasive elements and the rings.

3. The method of machining the outer surface of a plurality of split rings which includes the steps of; clamping the rings against rotation, relatively reciprocating and rotating an abrading tool over said rings after the abrasive stones thereof have been moved into circumferential engagement with said rings, continuing said operation until the surface of the stones has worn to complete circumferential engagement with said rings, and finishing the operation on said complete circumference of said ring with a relative movement only in reciprocation.

4. The method of machining the outer surface of a plurality of split rings which includes the steps of; mounting the rings loosely upon an arbor, of disposing the rings and a tool in position to hone said rings, of contracting the tool to a predetermined fixed diameter, of relatively reciprocating said hone and rings for machining the entire periphery of the rings during said movement in reciprocation only with an engaging pressure provided only by the tension in said rings.

KIRKE W. CONNOR.